United States Patent
Chene et al.

(10) Patent No.: US 8,811,644 B2
(45) Date of Patent: Aug. 19, 2014

(54) MEMBER FOR TRANSMITTING THE SOUND OF A LOUD-SPEAKER TO THE EAR AND EQUIPMENT FITTED WITH SUCH MEMBER

(76) Inventors: Richard Chene, Neuilly-sur-Seine (FR); Dominique Delamour, Les Mesnuls (FR); Alain Miklitarian, Paris (FR); Olivier Rodi, Gambais (FR)

( * ) Notice: Subject to any disclaimer, the term of this patent is extended or adjusted under 35 U.S.C. 154(b) by 1060 days.

(21) Appl. No.: 12/595,701

(22) PCT Filed: Apr. 10, 2008

(86) PCT No.: PCT/FR2008/000495
§ 371 (c)(1),
(2), (4) Date: Dec. 18, 2009

(87) PCT Pub. No.: WO2008/142274
PCT Pub. Date: Nov. 27, 2008

(65) Prior Publication Data
US 2010/0208928 A1 Aug. 19, 2010

(30) Foreign Application Priority Data

Apr. 10, 2007 (FR) ..................... 07 02586
Jul. 2, 2007 (FR) ..................... 07 04751

(51) Int. Cl.
*H04R 25/00* (2006.01)
*G02C 11/06* (2006.01)
(52) U.S. Cl.
CPC ............. *H04R 25/60* (2013.01); *G02C 11/06* (2013.01); *H04R 25/65* (2013.01)
USPC ......................................... 381/330; 381/328

(58) Field of Classification Search
USPC ......... 381/324, 327, 328, 330, 381, 380, 382; 181/129, 130, 135
See application file for complete search history.

(56) References Cited

U.S. PATENT DOCUMENTS

| | | | |
|---|---|---|---|
| 2,545,731 A | 3/1951 | French | |
| 3,618,698 A | 11/1971 | McCabe et al. | |
| 4,864,610 A * | 9/1989 | Stevens | 379/431 |
| 4,977,976 A * | 12/1990 | Major | 181/130 |
| 5,488,205 A * | 1/1996 | Major | 181/129 |
| 5,975,235 A * | 11/1999 | Schlaegel et al. | 181/129 |

(Continued)

FOREIGN PATENT DOCUMENTS

| | | |
|---|---|---|
| CH | 673 365 | 2/1990 |
| DE | 102 01 324 | 8/2003 |
| DE | 10 2005 008 319 | 8/2006 |

OTHER PUBLICATIONS

International Search Report dated Oct. 27, 2008, from corresponding PCT application.

*Primary Examiner* — Davetta W Goins
*Assistant Examiner* — Phylesha Dabney
(74) *Attorney, Agent, or Firm* — Young & Thompson

(57) ABSTRACT

A member includes a proximal portion (3) that can be connected to an apparatus (1) including an immobilization element relative to the head of a wearer, and a distal end (4a) adapted for directing sound into the external auditory canal, characterized in that the portion (3) is provided with a connection member adapted for a rigid connection with the apparatus (1) while the distal end (4a) is adapted so as to be inserted into the concha (C) of the ear opposite the entrance of the external auditory canal and is free from elements for establishing a contact immobilization with any portion of the ear.

9 Claims, 4 Drawing Sheets

(56) References Cited

U.S. PATENT DOCUMENTS

| | | | |
|---|---|---|---|
| 6,000,492 A * | 12/1999 | Puthuff et al. | 181/135 |
| 6,009,183 A * | 12/1999 | Taenzer et al. | 381/330 |
| 6,681,022 B1 * | 1/2004 | Puthuff et al. | 381/338 |
| 6,961,440 B1 * | 11/2005 | Schlaegel | 381/382 |
| 7,027,608 B2 * | 4/2006 | Fretz et al. | 381/330 |
| 7,082,207 B2 * | 7/2006 | Rapps | 381/381 |
| 7,139,404 B2 * | 11/2006 | Feeley et al. | 381/330 |
| 2003/0231783 A1 | 12/2003 | Kah, Jr. | |
| 2004/0160572 A1 | 8/2004 | Jannard et al. | |
| 2005/0248717 A1 | 11/2005 | Howell et al. | |

* cited by examiner

MEMBER FOR TRANSMITTING THE SOUND OF A LOUD-SPEAKER TO THE EAR AND EQUIPMENT FITTED WITH SUCH MEMBER

The present invention relates to a member for transmitting the sound of a loudspeaker to the ear.

Before considering the prior art, the anatomy of the part of the ear with which the invention is concerned, namely the outer ear, will be briefly described, with reference to FIG. 1: this comprises the pinna P, the concha C and the external auditory canal CAE.

Many devices have been devised for transmitting a soundwave to the entrance of the ear. These can be classified into three general categories:

headsets, earphones, earbuds and obstructive hearing aids, and non-obstructive hearing aids.

Headsets allow the use of good-quality loudspeakers but have the drawback that they are not discreet, they obstruct the pinna of the ear by enclosing it and squashing it, which sooner or later becomes uncomfortable.

In earphones, earbuds and obstructive hearing aids, the loudspeaker is housed and held, by contact, in the entrance of the external auditory canal, and, while these products have the advantage of being discrete, they have the disadvantage of having to use loudspeakers that are small, weak (especially in the deeper sounds), uncomfortable, and obstruct the external auditory canal, with the problems which this causes such as resonance of the wearer's own voice or sounds of chewing, lack of escape route for high sound pressure levels, barrier to the hearing of noises from the environment, etc.

Non-occlusive hearing aids are kept in position by a component having at least one passage connecting the external auditory canal to the surrounding environment. This component is housed in the entrance of the external auditory canal and is held against its walls. A hearing aid of this type transmits sound through a capillary tube designed to be as discreet as possible. To hold it in place it employs a pierced dome which sits in the entrance of the external auditory canal and presses against its walls. A plastic filament leading away from the capillary tube, in the vicinity of the dome, is also designed to be placed in the concha of the ear to keep the whole in place.

Lastly, other devices are designed to transmit a soundwave without vibrating the column of air around the external auditory canal (bone transmission using a vibrator). These devices require high pressures from the vibrator and their sound quality is limited by the impedance of the bones and the damping effect of the skin.

It is an object of the present invention to offer a member for transmitting the sound of a loudspeaker to the ear without having any of the disadvantages outlined above.

To this end, the member, which comprises, in a manner known per se:

a proximal part capable of being mounted on equipment comprising means for immobilizing it relative to the head of a wearer, and a distal part suitable for directing the sound into the external auditory canal, is characterized in that said proximal part is provided with, or forms, a means of attachment suitable for a rigid connection to said equipment, and in that the distal end of said distal part is suitable to be positioned in the concha of the ear, facing the entrance to the external auditory canal, and has no means of immobilizing it by contact with any part of the ear, the adjectives proximal and distal referring to the relative position with respect to said equipment.

The member according to the invention thus does not enter the external auditory canal and the distal end of its distal part is held in position not by pressing against part of the ear, but without contact, due to the rigid mounting of the member on the equipment which is immobilized to the wearer's head.

This equipment may be an electronic arm belonging to a frame of a pair of eye glasses (which may be optical eye glasses, sunglasses, or safety glasses, or goggles for skiing or other sports), an earphone, a clip-on earring, a headband, a bow for the hair, a headset, an independent visor or peak, a protective helmet such as a motorcyclist's or fireman's helmet, or a hearing aid, this list of examples not being exhaustive.

Not being obstructive, the member according to the invention does not disturb the wearer's sense of balance, offers an escape route for high acoustic pressure levels, and allows ordinary noises to be heard. Moreover, being "contactless", it is perfectly comfortable.

In an initial embodiment of the invention, the member is hollow and the loudspeaker is positioned toward the proximal end of the proximal part of the member.

This embodiment allows the use of a wide variety of loudspeakers, including those of large diameter, and these do not have to be in the immediate vicinity of the ear.

To facilitate the adaptation to the wearer's morphology, the distal end of the distal part of the member may include a termination that can be broken off at the required length.

In another embodiment, the member includes, toward the distal end, a removable coupling end attachable to the adjoining proximal part of said member, for example, by male-female engagement. This kind of removable coupling end can be a useful way of providing the adjoining part of a coupling end whose diameter will be more suitable for the size of the concha of the wearer. The ability to replace one coupling end with another may also be desirable for reasons of hygiene, if the equipment incorporating the member according to the invention is used sometimes by one person and sometimes by another.

Said coupling end is preferably mounted in such a way as to be rotatable about the longitudinal axis of said adjoining part in order to facilitate the orientation of the mouth at the distal end of the distal part with respect to the entrance of the auditory canal.

In a second embodiment, the member according to the invention is solid and the loudspeaker is positioned toward the distal end of the distal part of the member. In other words, once again, the loudspeaker is positioned in the concha, without contact. Clearly, in saying that the member is solid, it should be remembered that it does include the passage required to connect the loudspeaker with its source of electrical signals.

Whether the member according to the invention is hollow or solid, it preferably has a cross section of between 3.2 and 40 mm$^2$ so that, when positioned in the concha, without being pushed in, there is a peripheral region left open all the way around the distal end of its distal part.

In a preferred embodiment, for the purposes of adapting it to the wearer, the member is deformable when a force is deliberately applied, but retains, under normal service conditions, the shape thus given to it by deformation.

To this end, one possibility is for the member to be made of a thermoplastic. It can then simply be softened with heat so that it can be given the desired shape, which it will then retain on cooling.

Another possibility is for the member to be made of a flexible material containing a deformable reinforcement, such as a wire or a metal sheath.

The shape of the member is preferably such that in service the distal end of its distal part is approximately orthogonal to the temporo-mandibular plane of the wearer.

To improve the quality of the sound reproduction, the present invention also provides that, along at least a part of the distal end of said member, this latter and a component, that has a cavity forming a hollow chamber opening toward the concha, are placed side by side.

This hollow chamber, or resonator, thus forms with the concha an acoustic chamber which gives incomparable volume and quality to the sound.

In a practical embodiment, the closed side of the cavity forming the hollow chamber is shaped approximately as a portion of a sphere.

Although the risk of excess acoustic pressure waves is adequately limited by the fact that part of the concha remains open to the exterior, leaving an outlet for excess pressure waves, and at the same time allowing external sounds to be received, the wall of said component forming the hollow chamber is advantageously interrupted, for safety's sake, by a narrow passage connecting said cavity to the surrounding environment in the direction away from said concha.

In a preferred embodiment, said component forming a hollow chamber is removable and comprises, as said member does also, male/female, or female/male means of mutual connection allowing the temporary connection of one to the other.

In practice, said means of mutual connection may consist of a rod projecting from the wall of said member and a passage formed in the wall of said component, said rod being such that it can be received with slight friction in said passage.

Said passage is advantageously a through passage and said rod is of a length such that it protrudes sufficiently from said passage to serve as means of connection to another accessory, which accessory may form a sound isolating surface.

This isolating surface, which may be of any shape, such as parabolic, is intended to limit the arrival of external sounds without preventing the escape of excess pressure waves due to sounds received in the ear via the member according to the invention.

Last of all, the wall of the component forming the hollow chamber may be of a shape appropriate to contain electronic components, such as the electronic circuitry of a hearing aid, or the electronic circuitry for analyzing the sound received from the surrounding environment and processing it in real time to cancel it out by a corresponding opposite noise, using known techniques, the opposite noise being emitted into the hollow chamber by the electronic circuitry contained in the wall of said chamber.

The invention is described below with further details referring to the appended drawings, in which.

Figure 4:
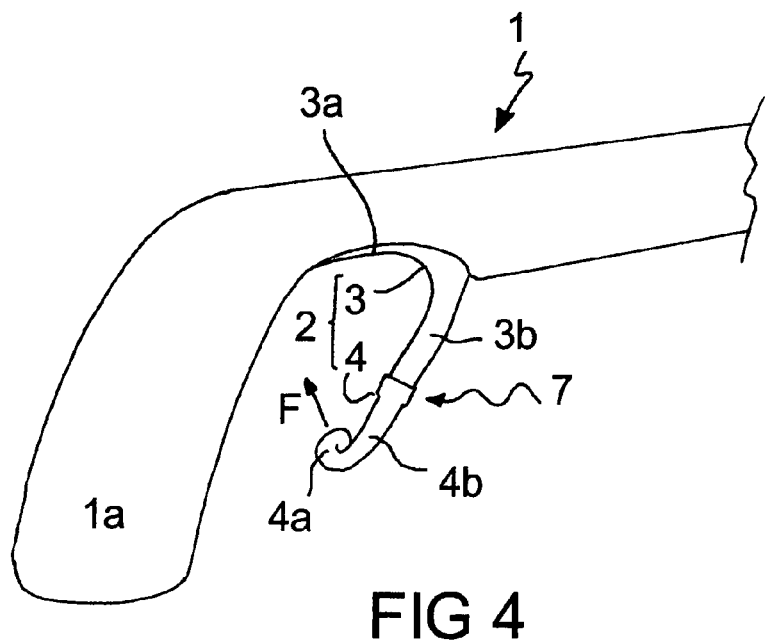
FIG. 4 is a partial perspective view of an "electronic" arm for a frame for eye glasses fitted with a member according to the invention.

In order better to explain what follows, FIG. 4 will now be referred to briefly: this shows one arm of a pair of eye glasses 1 equipped with a member 2 according to the invention. This member 2 comprises, a proximal part 3 mounted on the arm 1, said arm containing the desired sound-emitting means, and a distal part 4, the distal end 4a of which comes to an open end directed as indicated by the arrow F.

Figure 1:
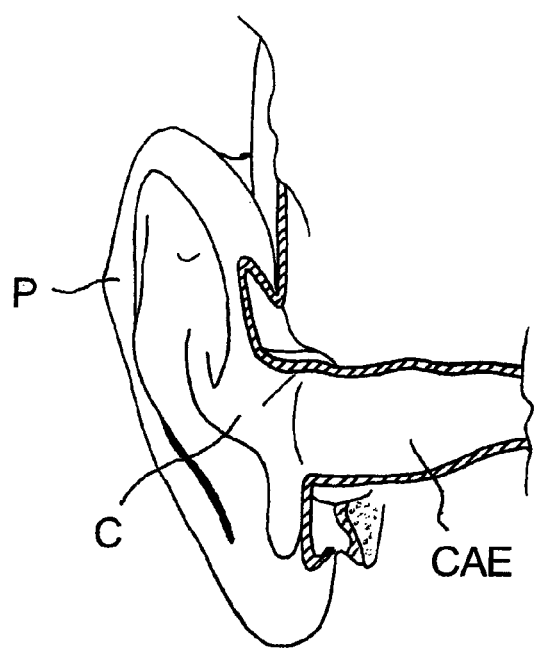
FIG. 1 is a diagram showing a partial cross section through the outer ear.

The reader should now consult FIG. 1 which shows, as indicated in the introduction, that the outer ear comprises the pinna P, the concha C and the external auditory canal CAE.

Figure 2:
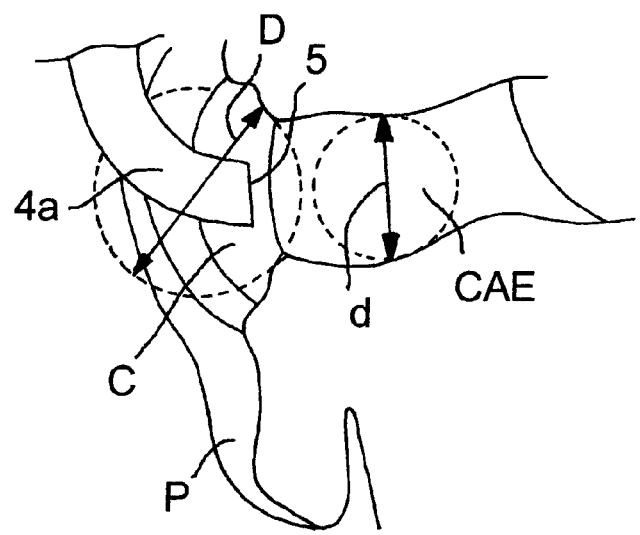
FIG. 2 is a diagram showing the in-service position of the distal end of the distal part of one embodiment of the invention.

In FIG. 2 the same parts have been shown simplified with, in position, the distal end 4a of the distal part of one embodiment of the invention. As will be seen, the size of the concha C can be represented by that of a sphere that could be fitted inside it and this sphere has a diameter D of usually between 8 and 15 mm. Similarly, the size of the external auditory canal CAE can be represented by that of a sphere that could be fitted within it and this sphere has a diameter d of usually between 5 and 8 mm. FIG. 2 shows clearly that the distal end 4a enters the concha C and its open end at 5 is in the axis of the external auditory canal CAE but does not touch either the pinna P or the walls of the concha C. It is also clear that the distal end 4a does not enter the external auditory canal CAE. By construction, the end 4a can be longer than that shown and can be cut to the desired length so as not to enter the canal CAE. The diameter of the distal end 4a is between 2 and 7 mm.

Figure 3A:
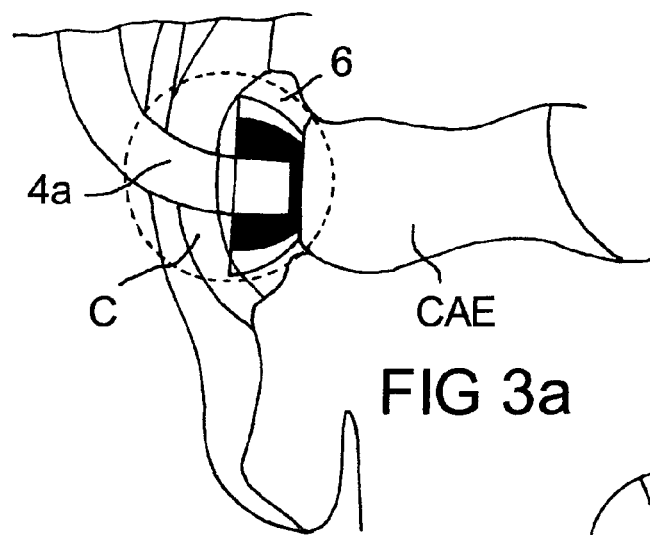
FIG. 3a is a diagram showing a variant of a distal end of said distal part and FIG. 3b is an end view of this distal end.
Figure 3B:
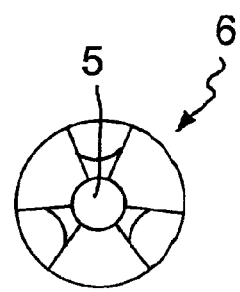

FIG. 3a shows a variant in which the mouth of the distal end 4a is provided with a corolla 6 in the form of a portion of a sphere with three petals separated by empty spaces to offer as much free passage as possible between the external auditory canal CAE and the concha C. This corolla has a function of protecting the canal CAE: in service, it is not in contact with the canal CAE, but if a force tending to push the distal end 4a into the canal CAE would act accidentally on the member according to the invention, the corolla 6, being of a larger diameter than the entrance of the canal CAE, would meet the peripheral wall of this entrance and prevent the distal end 4a from being pushed any further in.

Returning to FIG. 4, the proximal part 3 of the member 2 according to the invention can be seen to be in the general shape of a U lying on its side with one leg 3a in line with the arm of the eye glasses 1 and mounted on the latter, and the other leg 3b pushed into a coupling end 4b whose free end is the distal end 4a of the member. The coupling end 4b is mounted in such a way that it is able to rotate at 7 on the adjoining part 3b, which allows it to be adjusted in such a way that, in service, its free end 4a is approximately orthogonal to the plane occupied by the arm of the eye glasses, that is, the temporo-maxillary plane of the wearer. The member 2 is hollow and transmits to the entrance of the canal CAE the sound which it receives from a loudspeaker incorporated in the return 1a of the arm.

The member 2 may for example be made of nylon, acrylonitrile-butadiene-styrene or any other equivalent material which will occur to the person skilled in the art.

Figure 5:
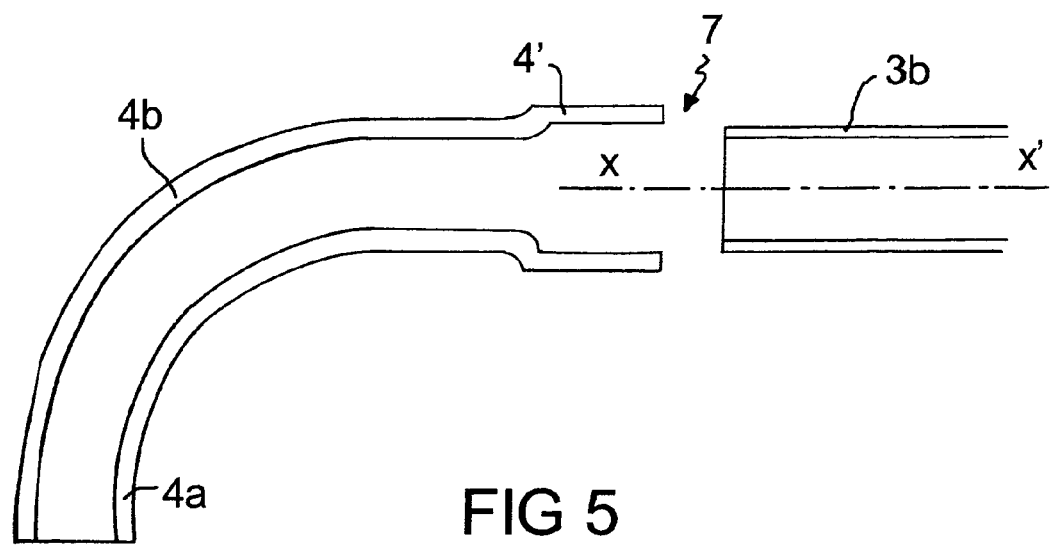
FIG. 5 is a diagram on a larger scale illustrating the relationship between the coupling end of the distal part and the adjoining part in the embodiment shown in FIG. 4.

FIG. 5 shows the principle of the assembly of the coupling end 4b to the adjoining part 3b. As will be seen, the coupling end 4b comprises a region of enlarged cross section 4' adapted to take the adjoining part 3b and to rotate about the longitudinal axis X-X' of the latter. Snap-fastening means (not shown) prevent accidental disconnection of the two components.

Figure 6:
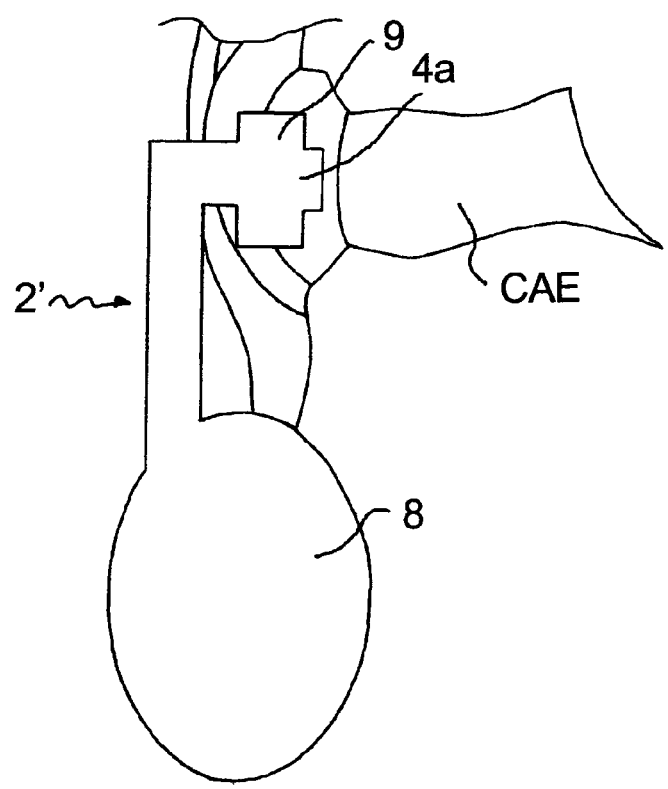
FIG. 6 is a diagram illustrating the case of an earring equipped with a member according to the invention.

FIG. 6 shows another possible embodiment of the invention. Here, the equipment on which the member 2' according to the invention is mounted is a clip-on earring 8, said member 2' is solid and the loudspeaker 9 is at the distal end 4a of the member.

Figure 7:
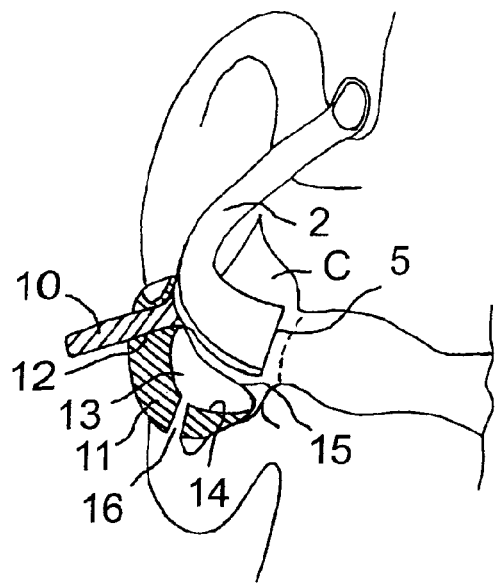
FIG. 7 is a diagram illustrating, in position, a sound transmitting member provided with a hollow chamber or resonator.

Turning now to FIG. 7, this shows the member 2 with its open end at 5 within the concha C. In this case, however, the member 2 is provided with a rod 10 onto which is mounted, with slight friction, a component 11 pierced, for this purpose, by a through passage 12. The component 11 has a cavity 13 whose closed side 14 is shaped approximately as a portion of a sphere and which is open at 15 towards the concha C. As can be seen, the component 11 and the member 2 are thus placed side by side and the end of the component 11, away from the passage 12, sits in the border of the concha below the open end 5 of the member 2. The concha C remains however open to the exterior in its upper region C'.

The cavity 13 forms with the concha C an acoustic chamber of a volume greater than that of the concha, thus greatly improving the volume of the sound and its quality.

A narrow passage 16 connects the cavity 13 to the surrounding environment, away from the concha, this being a safety measure to carry away potential but unlikely excess acoustic pressure waves.

The thickness of the wall of the component 11 may accommodate a housing containing electronic components or, in a variant, such components may be embedded within the thickness of this wall.

As FIG. 6 shows, the rod 10 projects outwards from the component 11. It allows for the attachment of an accessory, provided for this purpose with a passage which may be a blind passage or a through passage. Such an accessory 17, with a through passage 18, is shown in place in FIG. 7: it is an isolating surface that opens at one end at 19 towards the concha C, and at the other end at 20 to the surrounding environment.

Figure 8:
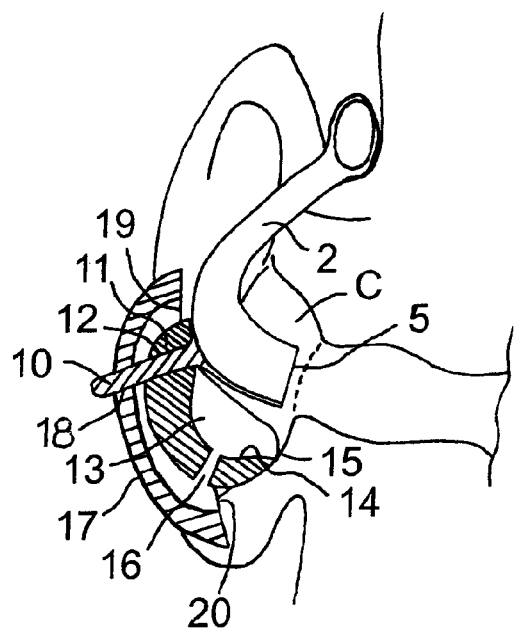
FIG. 8 is a view similar to FIG. 7 and shows in addition an isolating surface mounted on said hollow chamber.
Figure 9:
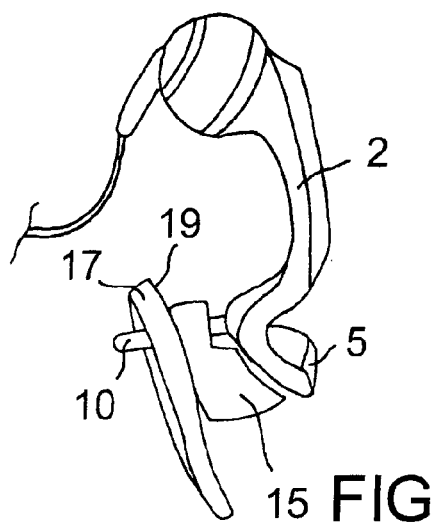
FIG. 9 is a perspective drawing of an earphone equipped in accordance with the invention.

The perspective view of FIG. 8, showing an earphone equipped in accordance with the invention, again shows the member 2 which opens at 5, the component 11 forming the hollow chamber, and the isolating surface 17, the component 11 and the isolating surface 17 both being mounted on the rod 10.

It will be understood that the invention is not limited to the embodiments described and illustrated. For example, the use of a solid member provided at its distal end with a loudspeaker is not limited to the case in which the equipment is mounted on an earring: it could equally well be an arm of a pair of eye glasses, a motorcycling helmet or the like. Also, instead of being fitted onto a rod, the component 11 and/or the accessory 17 could be joined together by a press-button type system or the like. Furthermore, rather than be removable, the component 11 could be permanently attached to the member 2. Similarly the isolating surface 17 could be permanently attached to the component 11.

The invention claimed is:

1. A member for transmitting sound to the ear, comprising:
   a proximal part capable of being mounted on equipment that is configured to immobilize said member relative to the head of a wearer, and
   a distal part suitable for directing the sound into the external auditory canal, wherein
   said proximal part is provided with, or forms, a structure suitable for a rigid connection to said equipment, and wherein
   a distal end of said distal part is suitable to be positioned in the concha of the ear, facing the entrance to the external auditory canal, and has no structure to immobilize said distal part by contact with any part of the ear, the adjectives proximal and distal referring to the relative position with respect to said equipment, and wherein
   said distal end comprises a removable coupling end attachable to the proximal part of said member, said coupling end being mounted in such a way as to be rotatable about the longitudinal axis of said adjoining part
   said member for transmitting sound to the ear further comprising a removable component extending along at least a part of the distal end of said member, said removable component having a cavity forming a hollow chamber opening toward said concha, a rod projecting from the wall of said member and a passage being formed in the wall of said removable component, said rod being such that it can be received with slight friction in said passage.

2. The member as claimed in claim 1, wherein, when a force is deliberately applied, said member is deformable for the purposes of adapting it to the wearer, but retains, under normal service conditions, the shape thus given to it by deformation.

3. The member as claimed in claim 1, wherein said member is made of a thermoplastic which, when a force is deliberately applied thereto, is deformable for the purposes of adapting the member to the wearer, but which retains, under normal service conditions, the shape thus given to it by deformation.

4. The member as claimed in claim 1, wherein said member is made of a flexible material containing a deformable reinforcement which, when a force is deliberately applied thereto, is deformable for the purposes of adapting the member to the wearer, but which retains, under normal service conditions, the shape thus given to it by deformation.

5. The member as claimed in claim 1, said rod being of a length such that it protrudes sufficiently from said passage to permit connection to another accessory.

6. The member as claimed in claim 1, said rod being of a length such that it protrudes sufficiently from said passage to permit connection to another accessory forming a sound isolating surface.

7. A member for transmitting sound to the ear, comprising:
   a proximal part capable of being mounted on equipment and configured to immobilize said member relative to the head of a wearer, and
   a distal part suitable for directing the sound into the external auditory canal, wherein
   said proximal part is provided with, or forms, an attachment suitable for a rigid connection to said equipment, and
   a distal end of said distal part is suitable to be positioned in the concha of the ear, facing the entrance to the external auditory canal, and has no structure to immobilize said distal part by contact with any part of the ear, the adjectives proximal and distal referring to the relative position with respect to said equipment, and
   further comprising a removable component extending along at least a part of the distal end of said member, said removable component having a cavity forming a hollow chamber opening toward said concha, a rod projecting from the wall of said member and a passage being formed in the wall of said removable component, said rod being such that it can be received with slight friction in said passage.

8. The member as claimed in claim 7, wherein said rod is of a length such that it protrudes sufficiently from said passage to connect to another accessory.

9. The member as claimed in claim 7, wherein said rod is of a length such that it protrudes sufficiently from said passage to serve as means of connection to another accessory forming a sound isolating surface.

* * * * *